United States Patent
Osman et al.

(10) Patent No.: US 11,972,060 B2
(45) Date of Patent: Apr. 30, 2024

(54) GESTURE TRAINING FOR SKILL ADAPTATION AND ACCESSIBILITY

(71) Applicant: Sony Interactive Entertainment Inc., Tokyo (JP)

(72) Inventors: Steven Osman, San Mateo, CA (US); Olga Rudi, San Mateo, CA (US); Mahdi Azmandian, San Mateo, CA (US); Jorge Arroyo Palacios, San Mateo, CA (US); Ravi Coimbatore Madhavan, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/817,445

(22) Filed: Aug. 4, 2022

(65) Prior Publication Data
US 2024/0045508 A1   Feb. 8, 2024

(51) Int. Cl.
G06F 3/01 (2006.01)
A63F 13/211 (2014.01)
A63F 13/212 (2014.01)
A63F 13/533 (2014.01)
G06N 20/00 (2019.01)

(52) U.S. Cl.
CPC .......... *G06F 3/017* (2013.01); *A63F 13/211* (2014.09); *A63F 13/212* (2014.09); *A63F 13/533* (2014.09); *G06N 20/00* (2019.01)

(58) Field of Classification Search
None
See application file for complete search history.

(56) References Cited

U.S. PATENT DOCUMENTS

| | | | |
|---|---|---|---|
| 10,617,961 B2* | 4/2020 | Ma | A63F 13/847 |
| 2019/0197828 A1* | 6/2019 | Pettie | G07F 17/3244 |
| 2020/0097091 A1* | 3/2020 | Chou | G06V 40/28 |
| 2021/0023453 A1* | 1/2021 | DeVico | A63F 13/67 |
| 2021/0103348 A1* | 4/2021 | Jeppsson | G06F 3/04845 |
| 2022/0164097 A1* | 5/2022 | Tadros | G06F 3/0488 |
| 2022/0198180 A1* | 6/2022 | Weaver | G06F 3/017 |
| 2022/0326770 A1* | 10/2022 | Iliev | A61B 5/6893 |

OTHER PUBLICATIONS

"International Search Report and Written Opinion", dated Oct. 31, 2023, from the counterpart PCT application PCT/US23/071382.

* cited by examiner

*Primary Examiner* — Justin S Lee
(74) *Attorney, Agent, or Firm* — John L Rogitz (57) ABSTRACT

A system that teaches players gestures, for instance during the introduction of the game, and asks the player to invoke the gesture. Rather than asking the player to repeat over and over until the player succeeds, the game looks for commonality in the player's attempts, and after a small number of attempts, the game can learn how that player interprets the gesture given the player's own ability. The game can then adapt itself to look for that pattern to trigger the action.

21 Claims, 7 Drawing Sheets

GESTURE TRAINING FOR SKILL ADAPTATION AND ACCESSIBILITY

FIELD

The present application relates generally to gesture training for skill adaptation and accessibility.

BACKGROUND

Certain computer simulations such as certain computer game (both virtual reality (VR) and non-VR) assume a certain level of dexterity from their players. This could involve moving a motion controller in a certain path, at a certain speed (in the case of a gesture for example) in a VR game such as Beat Saber or The Wizards, or it could include pressing a button repeatedly in a combat game to break free from an opponent. As understood herein, some players may have difficulty performing these actions either because the actions are difficult to master or because the players have a physical disability which prevents them from executing the actions.

SUMMARY

Present principles provide a system that teaches players gestures, possibly during the introduction of the game, and asks the player to invoke the gesture. Rather than asking the player to repeat over and over until they succeed, the game can look for commonality in the player's attempts, and after a number of attempts (for instance three or four attempts), the game can learn how that player interprets the gesture given his own ability. The game can then adapt itself to look for that pattern to trigger the action.

Accordingly, an assembly includes at least one processor configured with instructions to present a first prompt for a person to make a first gesture. The first gesture is correlated in at least one computer simulation to a command. The instructions are executable to identify a first prompted gesture made in response to the prompt, present at least a second prompt for a person to make the first gesture, and identify a second prompted gesture made in response to the prompt. The instructions are further executable to input the first and second prompted gestures to at least one machine learning (ML) model along with an identification of the command to train the ML model. The instructions are executable to, after training the ML model, during execution of the computer simulation, identify a user gesture, input the user gesture to the ML model, and receive from the ML model, responsive to the input, at least one command.

In some examples the prompts are presented visibly on at least one video display. In other examples the prompts are presented audibly on at least one speaker.

In a non-limiting embodiment, the first and second prompted gestures each comprise a respective hand motion made once. In another non-limiting embodiment, the first and second prompted gestures each comprise a number of respective button presses greater than one.

In examples, the instructions can be executable to receive a signal from at least one physiological sensor, input the signal to the ML model, and receive output from the ML model indicating further learning is required, and/or alter execution of the computer simulation.

In other examples, the instructions can be executable to receive a signal from at least one motion sensor, input the signal to the ML model, and receive output from the ML model indicating further learning is required, and/or alter execution of the computer simulation.

In another aspect, a method includes training at least one machine learning (ML) model to recognize a manner in which a person makes at least one gesture correlated to at least one command to at least one computer simulation. The method also includes, during execution of the computer simulation, sending information representing at least one gesture made by the person to the ML model. The method includes receiving from the ML model at least one indication of at least one command, and executing the computer simulation according to the at least one command.

In another aspect, a device includes at least one computer readable storage apparatus that is not a transitory signal and that includes instructions executable to train at least one machine learning (ML) model to recognize a manner in which a person makes at least one gesture correlated to at least one command to at least one computer simulation. The instructions are executable to, during execution of the computer simulation, send information representing at least one gesture made by the person to the ML model. The instructions are further executable to receive from the ML model at least one indication of at least one command, and execute the computer simulation according to the at least one command.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
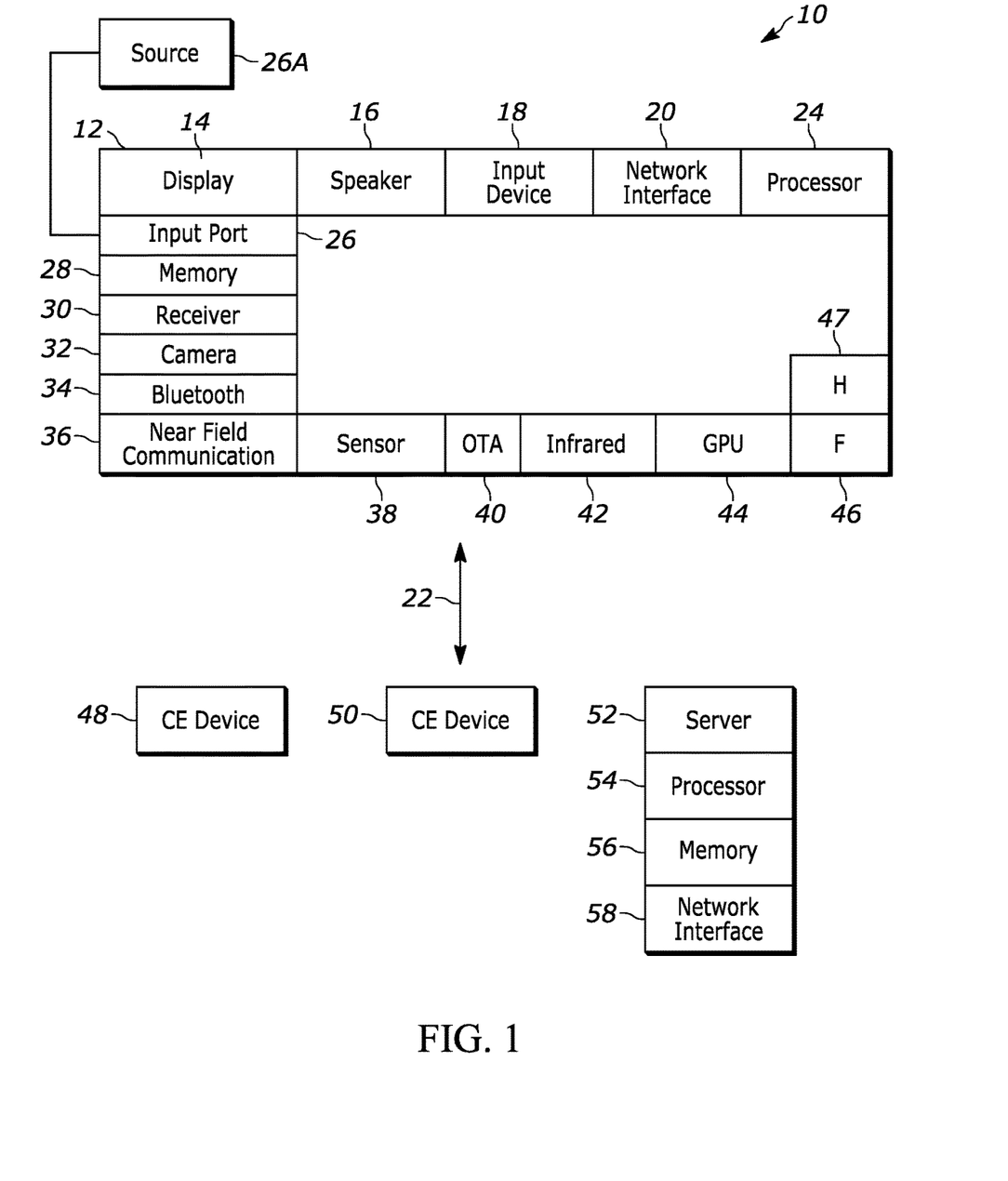
FIG. 1 is a block diagram of an example system in accordance with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24.

For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
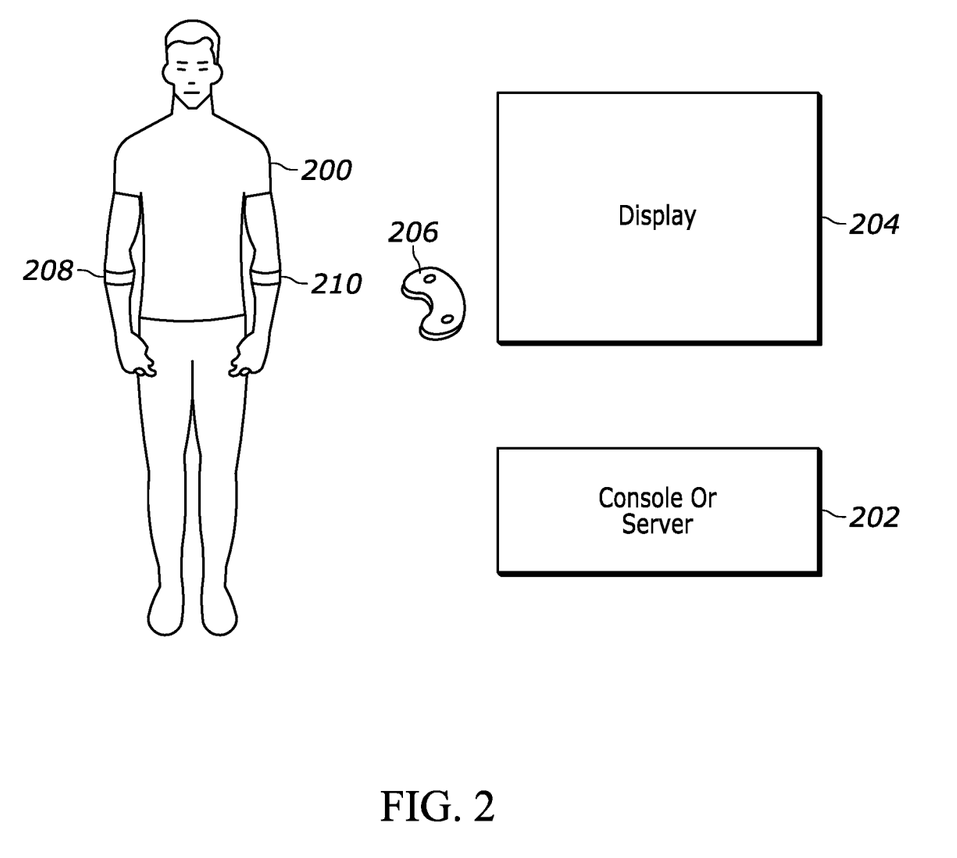
FIG. 2 illustrates a block diagram of a player of a computer simulation such as a computer game with various game components.

FIG. 2 illustrates an example system in which any of the devices may use any one or more of the appropriate components described above. A player 200 may play a computer simulation such as a computer game sourced from computer simulation console or server 202 and presented on a display 204 such as a TV and/or head-mounted display (HMD) worn by the person 200 using, e.g., computer simulation controller 206. Parameters of the person 200 may be sensed by one or more sensors such as a motion sensor 208 and physiological sensor 210. The motion sensor 208 when used generates a signal representative of motion of at least part of the person's body such as the head or arms or eyes. As but two non-limiting examples, the physiological sensor 210 may be a sensor to detect a physiological characteristic of the player. Example physiological sensors include a heart rate sensor or a camera that can detect the player's pulse, and a galvanic skin response (GSR) sensor to detect whether the player is under stress or aroused.

Figure 3:
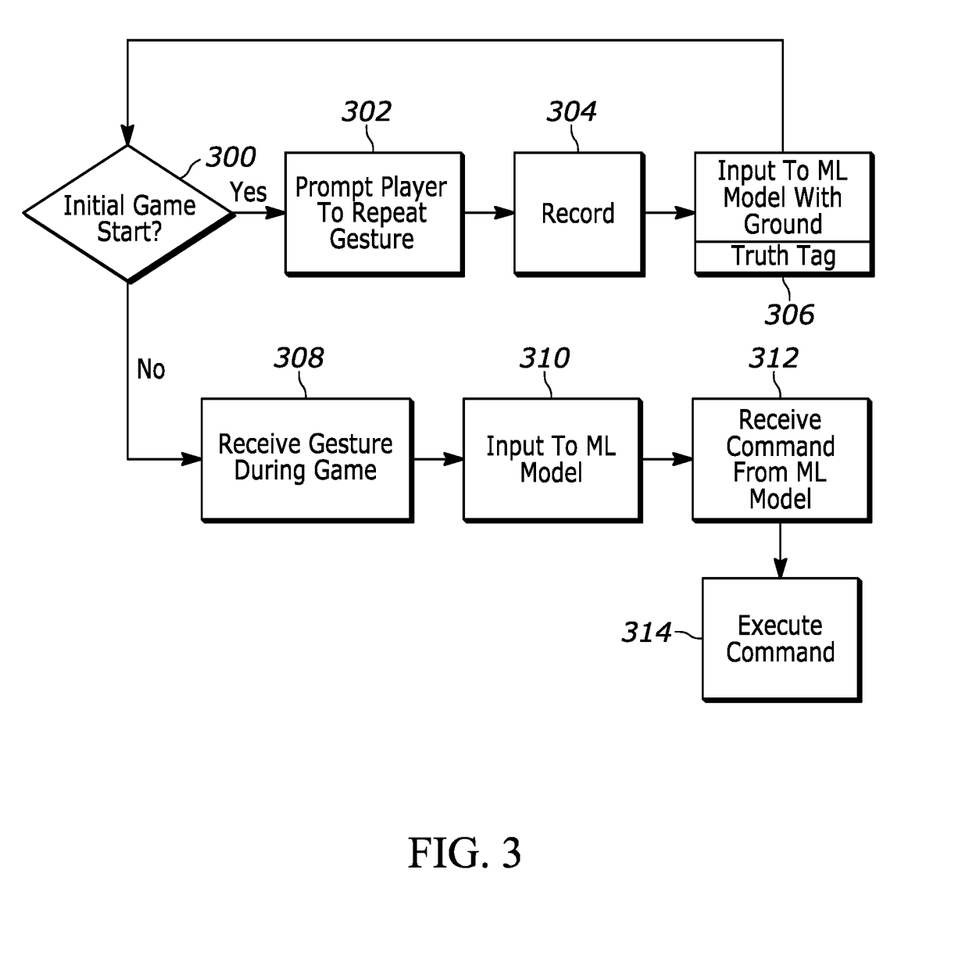
FIG. 3 illustrates example overall logic in example flow chart format.

FIG. 3 illustrates example overall logic consistent with present principles. In FIG. 3, two phases are illustrated, one a training phase in which a ML model is trained on individual motor skills or attributes of the player 200 shown in FIG. 2 and one phase being a play phase in which the trained ML model is used to generate commands based on gestures made by the player during game play. It is to be appreciated that the play phase may be used to further train the ML model after the training phase consistent with ML model training feedback, and that the training phase may be reentered more than once after initial training if necessary to refine training of the ML model.

In the example shown, the training phase may be entered responsive to a determination at decision diamond 300 that the player has for the first time invoked a particular computer simulation for which gesture input is accepted. This test may be executed by noting that the player's game console or streaming game receiver has initialized the simulation for the first time.

Proceeding to block 302, prior to executing the simulation, the player is prompted to make a particular gesture more than a single time. Each time the player makes the gesture, the gesture is recorded at block 304. The gesture may be recorded by imaging the player making the gesture. The gesture may be recorded by recording the gesture as may have been made by the player on a touch-sensitive display. The gesture may be recorded by counting the number of times the player has manipulated a particular control on the computer controller 206 shown in FIG. 2 and the temporal periods between successive manipulations of the control. These are but three examples of how a gesture may be recorded.

Proceeding to block 306, the repeated recordings of the same gesture are input to the ML model along with a ground truth tag as to a computer simulation command that the gestures are to be correlated to. In this way, the ML model is trained on how the particular player 200 shown in FIG. 2 executes a particular gesture as prompted in block 302.

After training, an audible and/or visual and/or tactile indication may be provided to the player 200 to indicate to the player that the system calibrated/adapted to the player's motions. For instance, a message "Motions Calibrated" may be presented on a display. This is to avoid confusion by making explicit that calibration was for the particular player 200, and not that the player randomly got it "right" this time and the system is bad at telling right from wrong.

Once the ML model is trained, the simulation may be executed by moving to block 308 in FIG. 3 in which one or more gestures are received from the player during execution of the simulation. The gesture(s) are input to block 310 to the trained ML model, and in response a corresponding game command is received back from the ML model at block 312. The command is executed at block 314 to present the simulation (computer game) consistent with the game command from block 312.

Figure 4:
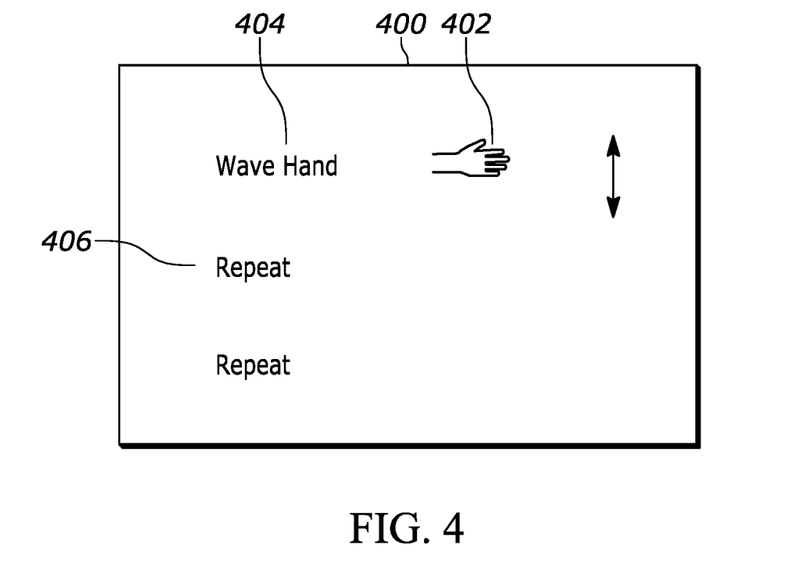
FIG. 4 illustrates an example user interface (UI) for the calibration phase.

FIG. 4 illustrates an example training phase. A display 400 such as any audible or visual display herein may present a prompt 402 to make a particular gesture, in the example shown, waving the hand up and down. The prompt may also indicate the command associated with the gesture. In addition to the written or audible prompt, the gesture may be illustrated as indicated at 404.

The player is asked to repeat the gesture at least once, as indicated at 406. In some cases, the player may be prompted to repeat the gesture several times.

Figure 5:
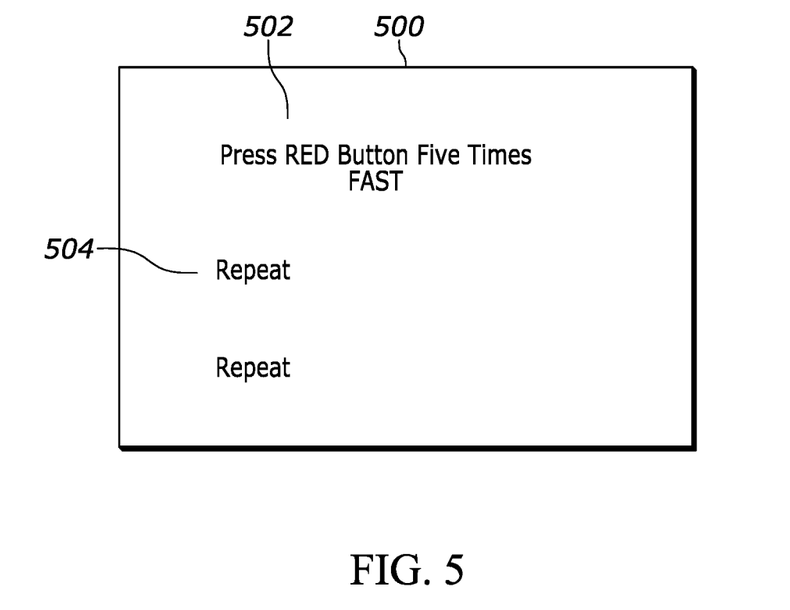
FIG. 5 illustrates another example UI for the calibration phase.

FIG. 5 illustrates another example training phase. A display 500 such as any audible or visual display herein may present a prompt 502 to make a particular gesture, in the example shown, pressing a particular control ("red button") a specified number of times (e.g., five) as quickly as the player can. The prompt may also indicate the command associated with the gesture. The player is asked to repeat the gesture at least once, as indicated at 504. In some cases, the player may be prompted to repeat the gesture several times.

The example of FIG. 5 recognizes that some combat based games, for example, require that a player that is knocked out/down press a button (such as the cross button) on a computer game controller many times rapidly to get her character to stand up again. That rapidity may be difficult for some players to achieve due to a multitude of reasons. First, the player may have a disability that prevents her from doing so. Moreover fatigue, hand sizes, and button placement may also make it difficult for some players to press some buttons with a certain speed. Rather than requiring a predefined speed of button press, the ML model can "learn" the player's speed during the first couple of times that feature is introduced to the player and use that speed as a threshold during game play.

Figure 6:
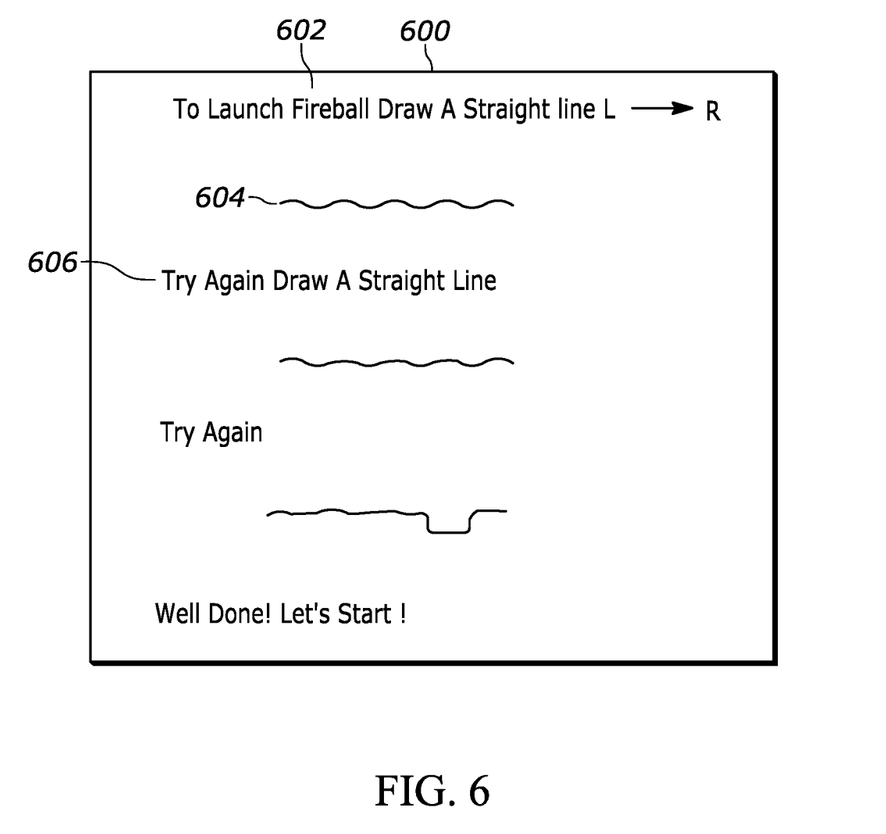
FIG. 6 illustrates yet another example UI for the calibration phase.

FIG. 6 illustrates yet another example training phase. A display 600 such as any audible or visual display herein may present a prompt 602 to make a particular gesture, in the example shown, drawing on a touch screen or tracing in the air a straight line from left to right to input a particular command, in the example shown, "launch a fireball".

The ensuing gesture made by the player is illustrated at 604, in the example shown, a wavy line. The gesture is recorded as described above, and then anther prompt 606 is presented for the player to make the gesture again. This may be repeated more than once.

For the example player of FIG. 6, the player consistently draws a wavy line instead of a straight line. Once the ML model has sufficient understanding that such a wavy line is the player's best attempt to draw a straight line, it may conclude training and prompt the player to start the game as indicated at 608.

In the non-limiting example shown, only three recordings of the player attempting a straight line are made, and it is assumed for disclosure purposes that there has been sufficient correlation between the examples provided that the ML model can identify from those examples a pattern, essentially learning this pattern as the player's interpretation of a straight line for use during game play to trigger the indicated command (launching a fireball). If there is not sufficient correlation, the ML model requests the player to continue trying until a sufficiently consistent signal is provided, regardless of whether the signal was the intended one.

Figure 7:
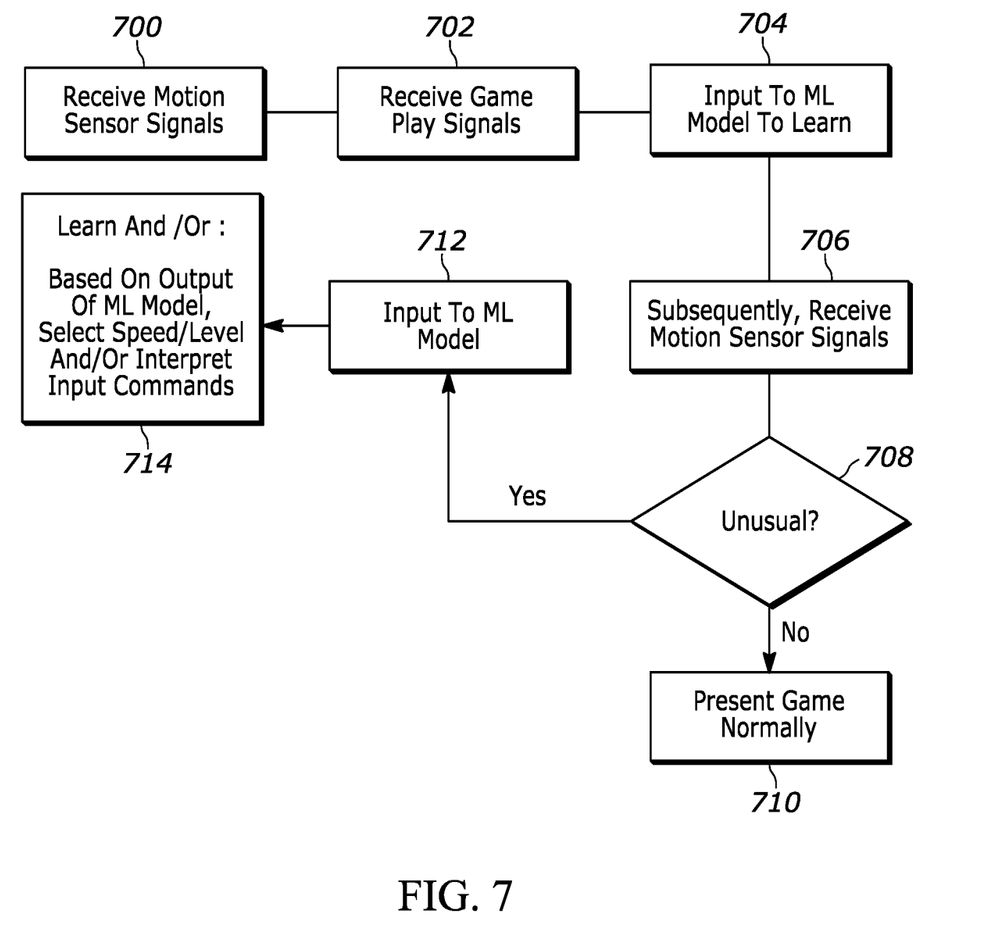
FIG. 7 illustrates example detailed logic in example flow chart format.
Figure 8:
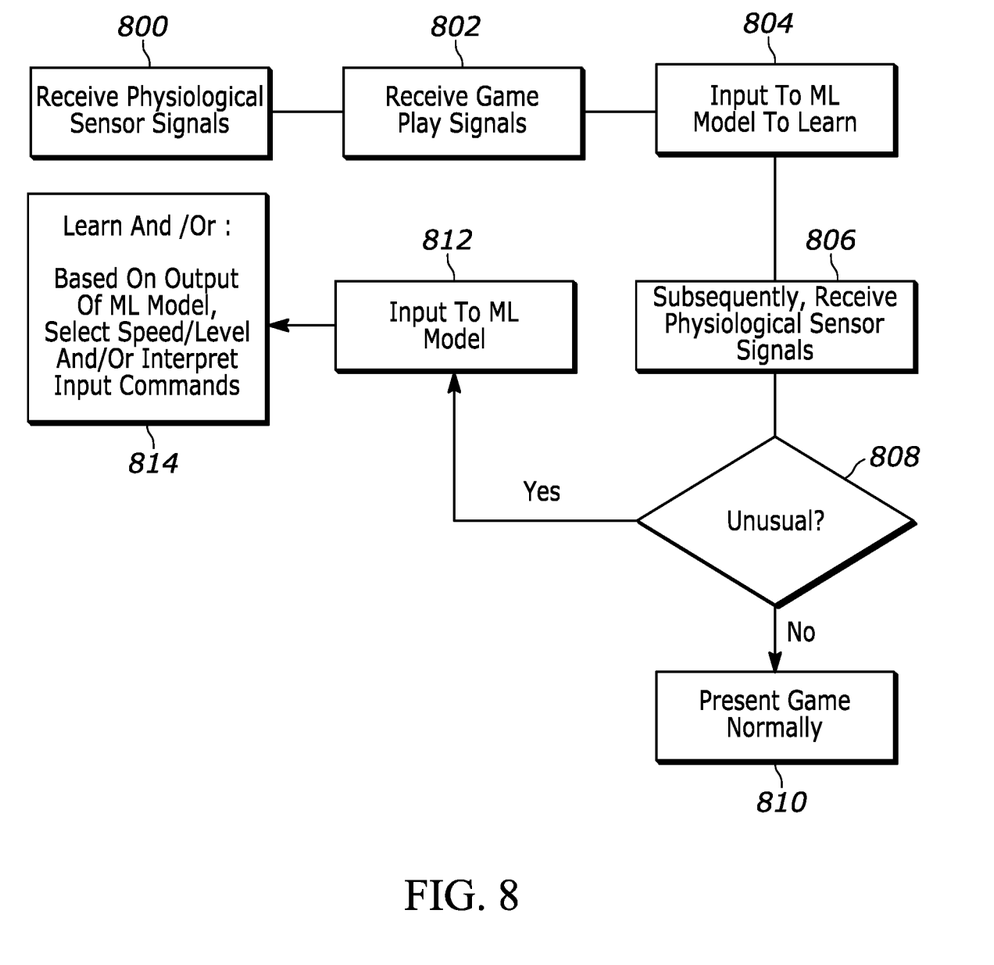
FIG. 8 illustrates further example detailed logic in example flow chart format.

FIGS. 7 and 8 illustrate that present principles may be used with motion sensors and/or physiological sensors such as those described in reference to FIGS. 1 and 2. As understood herein, a player's aptitude and ability to perform certain actions may be impaired based on physiological state. This could be dependent on stress level, fatigue level and other factors. Just as a game (through its ML model) can adjust to a player's baseline abilities in the previous two examples, the game can also correlate those abilities with a player's physiological state at the time. For example, do motion sensors detect that the player is moving a lot more or less than usual? This may correlate to the player's tiredness or inebriation. Is the player's heart rate elevated, as indicated by a heart rate sensor or a camera that can detect the player's pulse? Is the player under stress or aroused, as indicated by a GSR (galvanic skin response) sensor? If those states are out of the order, they can trigger an additional learning phase so the game can learn the player's abilities as they vary under different physiological states.

FIG. 7 illustrates that motion sensor signals indicating player motion (head, arms, hands, feet, or any combination) may be received at block 700. Game play signals, e.g., from a game controller, are received at block 702 and both the sensor signals and game play signals are input to the ML model at block 704 so that the model learns correlations between the sensor signals and game play signals.

Subsequently, at block 706, motion sensor signals are once again received during game play. If it is not determined that the motion sensor signals indicate unusual motion at decision diamond 708, the game is continued to be presented without modification at block 710. However, if the sensor signals indicate unusual motion of the player, the logic flow to block 712 to input the signals to ML model for further training at block 714. Also, at block 714 based on the output of the ML model the game execution is altered, e.g., the game is slowed down, the game is sped up, a different level is selected than what the level had been, input commands are interpreted differently according to the learned correlations, etc.

FIG. 8 illustrates that physiological sensor signals indicating player physiological state may be received at block 800. Game play signals, e.g., from a game controller, are received at block 802 and both the sensor signals and game play signals are input to the ML model at block 804 so that the model learns correlations between the sensor signals and game play signals.

Subsequently, at block 806, physiological sensor signals are once again received during game play. If it is not determined that the sensor signals indicate unusual motion at decision diamond 808, the game is continued to be presented without modification at block 810. However, if the sensor signals indicate unusual physiological state of the player, the logic flow to block 812 to input the signals to ML model for further training at block 814. Also, at block 814 based on the output of the ML model the game execution is altered, e.g., the game is slowed down, the game is sped up, a different level is selected than what the level had been, input commands are interpreted differently according to the learned correlations, etc.

Note that one or more user interfaces may be presented on a periodic basis or as triggered by certain events to allow people to retrain their gestures from time to time.

In addition to physiological inputs, additional inputs may be used including time of day (people may perform differently at different times), the player's posture (standing/sitting/laying down), as well as asking the player how they are feeling, or inferring feeling/emotion by observing their playing behavior (e.g., what games they launch may define their mood). The personalized gesture configuration can be uploaded to a cloud server and bound to the player's profile so when the player plays somewhere else than the location at which the gestures are trained at originally, the gesture recognition is assigned to the player's inputs at the remote location.

Learned gestures specific to a particular player may be used in other games as well as to seed other games. For example, a data-driven style transfer approach can be used, such as style transfer generative adversarial networks (GANs) or other approaches. In addition, or alternatively, a rule-based approach can be used, such as a rule for a particular player that the player's multi-click speed appears to be limited to two clicks per second. This way the trainer for new games/scenarios can be seeded with information from the original training in, e.g., FIG. 3.

While the particular embodiments are herein shown and described in detail, it is to be understood that the subject matter which is encompassed by the present invention is limited only by the claims.

What is claimed is:

1. An assembly, comprising:
   at least one processor configured with instructions to:
   present a first prompt for a person to make a first gesture, the first gesture being correlatable in at least one computer simulation to a command to control a character in a computer game and/or control a weapon in the computer game;
   identify a first gesture made in response to the prompt;
   present at least a second prompt for a person to make the first gesture;
   identify a second gesture made in response to the prompt;
   input the first and second gestures to at least one machine learning (ML) model along with an identification of the command to train the ML model;
   after training the ML model, during execution of the computer simulation, identify a user gesture;
   input the user gesture to the ML model; and
   receive from the ML model, responsive to the input, at least one command.

2. The assembly of claim 1, wherein the prompts are presented visibly on at least one video display.

3. The assembly of claim 1, wherein the prompts are presented audibly on at least one speaker.

4. The assembly of claim 1, wherein the first and second gestures each comprise a respective hand motion made once.

5. The assembly of claim 1, wherein the first and second gestures each comprise a number of respective displayed button object presses greater than one.

6. The assembly of claim 1, wherein the instructions are executable to:
   receive a signal from at least one physiological sensor;
   input the signal to the ML model; and
   receive output from the ML model indicating further learning is required.

7. The assembly of claim 1, wherein the instructions are executable to:
   receive a signal from at least one physiological sensor;
   input the signal to the ML model; and
   based at least in part on output from the ML model, alter execution of the computer simulation at least in part by changing a playback speed of the computer simulation and/or changing a skill level of the computer simulation.

8. The assembly of claim 1, wherein the instructions are executable to:
   receive a signal from at least one motion sensor;
   input the signal to the ML model; and
   receive output from the ML model indicating further learning is required.

9. The assembly of claim 1, wherein the instructions are executable to:
   receive a signal from at least one motion sensor;
   input the signal to the ML model; and
   based at least in part on output from the ML model, alter execution of the computer simulation at least in part by changing a playback speed of the computer simulation and/or changing a skill level of the computer simulation.

10. A method, comprising:
  training at least one machine learning (ML) model to recognize a manner in which a person makes at least one gesture correlated to at least one command to at least one computer simulation to control a character in-s in a computer game and/or control a weapon in the computer game;
  during execution of the computer simulation, sending information representing at least one gesture made by the person to the ML model;
  receiving from the ML model at least one indication of at least one command; and
  executing the computer simulation according to the at least one command to control the character in the computer game and/or control the weapon in the computer game.

11. The method of claim 10, comprising training the ML model to recognize player motion.

12. The method of claim 10, comprising training the ML model to recognize player physiological state.

13. A device comprising:
  at least one computer readable storage apparatus that is not a transitory signal and that comprises instructions executable to:
  train at least one machine learning (ML) model to recognize a manner in which a person makes at least one gesture correlated to at least one command to at least one computer simulation to control a character in a computer game and/or control a weapon in the computer game;
  during execution of the computer simulation, send information representing at least one gesture made by the person to the ML model;
  receive from the ML model at least one indication of at least one command; and
  execute the computer simulation according to the at least one command to control the character in the computer game and/or control the weapon in the computer game.

14. The device of claim 13, wherein the instructions are executable to:
  present a first prompt for a person to make a first gesture, the first gesture being correlated in at least one computer simulation to a command;
  identify a first prompted gesture made in response to the prompt;
  present at least a second prompt for a person to make the first gesture;
  identify a second prompted gesture made in response to the prompt; and
  input the first and second prompted gestures to the at least one ML model along with an identification of the command to train the ML model.

15. The device of claim 14, wherein the prompts are presented visibly on at least one video display.

16. The device of claim 14, wherein the prompts are presented audibly on at least one speaker.

17. The device of claim 14, wherein the first and second prompted gestures each comprise a respective hand motion made once.

18. The device of claim 14, wherein the first and second prompted gestures each comprise a number of respective button object presses greater than one.

19. The device of claim 13, wherein the instructions are executable to:
  receive a signal from at least one physiological sensor;
  input the signal to the ML model; and
  receive output from the ML model indicating further learning is required.

20. The device of claim 13, wherein the instructions are executable to:
  receive a signal from at least one physiological sensor;
  input the signal to the ML model; and
  based at least in part on output from the ML model, alter execution of the computer simulation at least in part by changing a playback speed of the computer simulation and/or changing a skill level of the computer simulation.

21. The assembly of claim 1, wherein the first prompt to make the first gesture comprises a prompt to press a particular control a specified number of times as quickly as possible.

* * * * *